(12) United States Patent
Schiestl

(10) Patent No.: US 11,535,981 B2
(45) Date of Patent: Dec. 27, 2022

(54) METHOD AND DEVICE FOR PRODUCING A THREE-DIMENSIONAL TEXTURE

(71) Applicant: Angelo Schiestl, Langkampfen (AT)

(72) Inventor: Angelo Schiestl, Langkampfen (AT)

( * ) Notice: Subject to any disclaimer, the term of this patent is extended or adjusted under 35 U.S.C. 154(b) by 416 days.

(21) Appl. No.: 16/642,347

(22) PCT Filed: Aug. 21, 2018

(86) PCT No.: PCT/EP2018/072496
§ 371 (c)(1),
(2) Date: Feb. 26, 2020

(87) PCT Pub. No.: WO2019/042815
PCT Pub. Date: Mar. 7, 2019

(65) Prior Publication Data
US 2020/0256012 A1 Aug. 13, 2020

(30) Foreign Application Priority Data
Aug. 28, 2017 (EP) .................................... 17188160

(51) Int. Cl.
*D06P 5/30* (2006.01)
*B33Y 10/00* (2015.01)
(Continued)

(52) U.S. Cl.
CPC ................ *D06P 5/30* (2013.01); *B33Y 10/00* (2014.12); *B33Y 80/00* (2014.12); *D06P 7/005* (2013.01); *D06Q 1/00* (2013.01)

(58) Field of Classification Search
None
See application file for complete search history.

(56) References Cited

U.S. PATENT DOCUMENTS

| 5,894,036 A * | 4/1999 | Tylko | B41M 3/00 156/244.11 |
| 7,132,159 B1 * | 11/2006 | Akhave | B05D 1/00 428/40.1 |

(Continued)

FOREIGN PATENT DOCUMENTS

| EP | 2189272 A2 * | 5/2010 | ............. B28B 1/001 |
| JP | 2003-336146 A | 11/2003 | |
| WO | 2005/113692 A1 | 12/2005 | |

OTHER PUBLICATIONS

English machine translation of Aufschnaiter et al. (EP 2189272 A2) Description and Claims, accessed online from Espacenet; pp. 1-38. (Year: 2010).*

(Continued)

*Primary Examiner* — Katie L. Hammer
(74) *Attorney, Agent, or Firm* — Studebaker & Brackett PC

(57) ABSTRACT

The present invention relates to a method of producing a defined three-dimensional texture on a textile, in which the texture is provided on a textile with a defined area and a defined height, the texture is formed with at least one texture layer, wherein the height and the area of the texture are adjusted by at least one defined height and at least one defined area of the at least one texture layer, at least one variable-volume ink is applied to the textile in the form of individual ink droplets, wherein a plurality of ink droplets are provided on the textile according to the area of the texture, and the applied ink droplets are activated, whereby a predefined volume increase of the ink droplets is produced and the at least one texture layer is formed on the textile. To provide the defined height of the at least one texture layer at least one defined distance between the applied ink droplets for the texture layer is adjusted, which distance is smaller than and/or equal to a diameter of activated ink droplets of (Continued)

Figure 1:
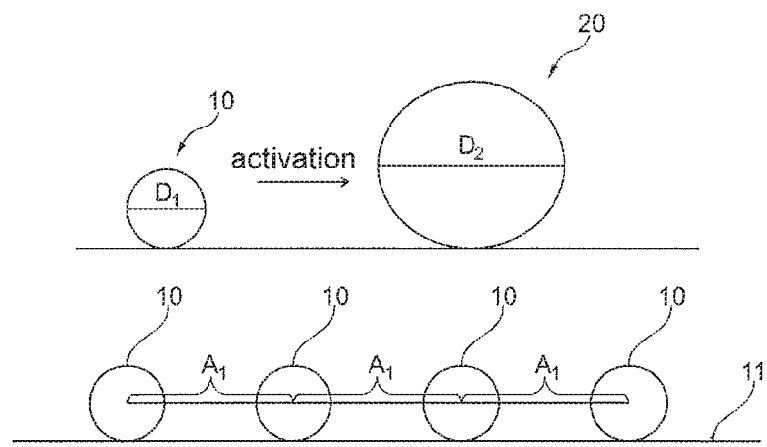

the texture layer. Furthermore, the present invention relates to a three-dimensional texture for a textile with an area and a height, and at least one texture layer which is formed from at least one variable-volume ink in the form of individual ink droplets and which can be applied to the textile and can be activated for a defined volume increase. The ink droplets of the at least one texture layer are provided with at least a distance from each other that is smaller than or equal to the diameter of activated ink droplets.

13 Claims, 3 Drawing Sheets

(51) Int. Cl.
*B33Y 80/00* (2015.01)
*D06Q 1/00* (2006.01)
*D06P 7/00* (2006.01)

(56) References Cited

U.S. PATENT DOCUMENTS 8,719,962 B1 * 5/2014 Huff .................... D06Q 1/02
2/69
2017/0144476 A1 5/2017 Postle et al.

OTHER PUBLICATIONS

International Search Report issued in PCT/EP2018/072496; dated Nov. 14, 2018.
Notification of Transmittal of Copies of Translation of the International Preliminary Report on Patentability and Translation of Written Opinion of the International Searching Authority; PCT/EP2018/072496; dated Mar. 3, 2020.

* cited by examiner

METHOD AND DEVICE FOR PRODUCING A THREE-DIMENSIONAL TEXTURE

The invention relates to a method of producing a defined three-dimensional texture on a textile according to the preamble of claim 1 and to a three-dimensional texture for a textile according to the preamble of claim 10.

In a method of this type, the texture is provided on the textile with a defined area and a defined height, the texture is formed with at least one texture layer, wherein the height and area of the texture are adjusted by at least one defined height and at least one defined area of the at least one texture layer, at least one variable-volume ink is applied to the textile in the form of individual ink droplets, wherein a plurality of ink droplets are provided on the textile according to the area of the texture, and the applied ink droplets are activated, whereby a predefined volume increase of the ink droplets is produced and the at least one texture layer is formed on the textile.

A corresponding three-dimensional texture for a textile is formed with an area and a height, and has at least one texture layer, which is formed from at least one variable-volume ink in the form of individual ink droplets, which can be applied to the textile and can be activated for a defined volume increase.

In the textile printing technology sector, a fundamental challenge lies in providing textures to be printed with a defined height profile.

It is known in principle to provide a printing ink on a textile, wherein a liquid for the three-dimensional texture to be created is applied over the entire area of the textile. By subsequent activation the ink material is foamed, whereby the texture is formed on the textile with a statistical height distribution.

This method is subject to a limitation in so far as the height distribution of the three-dimensional structure that is obtained can only be influenced by means of an activation period, i.e. a degree of foaming.

However, this type of control is disadvantageous in so far as a minimum activation period is necessary to provide the otherwise liquid and tacky ink on the textile in a permanent and fixed manner. There is therefore only a small margin of time in which a slight adaptation of the height of the three-dimensional texture on a textile is achievable. A more precise adjustment of the texture height is not rendered possible.

The present invention is based on the object of specifying a method and a product with which a three-dimensional texture can be prepared on a textile with any desired dimensions.

According to the invention the object is achieved by a method according to claim 1 and with the product according to claim 10. Preferred embodiments of the present invention are specified in the dependent claims.

The method according to the invention is characterized in that, to provide the defined height of the at least one texture layer, at least one defined distance between the applied ink droplets for the texture layer is adjusted, which distance is smaller than and/or equal to a diameter of activated ink droplets of the texture layer.

A first basic concept behind the invention consists in creating a defined region around the ink droplet by spacing apart the ink droplets for a texture layer, into which region the ink droplet can expand when activated. The distance can in principle be selected at will. Since the respective ink droplets within a texture layer are surrounded by further ink droplets, the region into which the respective ink droplet can expand is limited in the plane. By adjusting the limited region within a texture layer plane, a further directed expansion can be forced into an unlimited region, in particular upwards. By the defined adjustment of the mutual distance between the individual ink droplets in a texture layer and the associated defined limitation of the region available for an expansion of each individual ink droplet within the texture layer plane it is possible to adjust in a defined manner the height with which the texture layer, and in particular the individual expanded ink droplets, is/are formed.

The greater the distance selected between the individual ink droplets in a texture layer, the greater is the region within the plane that is available to the ink droplets for expansion. The greater the region available for expansion, the smaller will be the directed upward expansion since the total expansion, i.e. the total volume increase, can be predefined by the predefined volume increase of the ink droplets when activated. The directed expansion here defines the portion of the expansion which additionally takes place in an upward direction owing to the limited space in the texture layer to be formed. An unimpeded expansion without space limitation in the plane can approximately correspond to an increase in the diameter of a sphere, approximately evenly in all spatial directions.

As a result of the limited space that is available to the individual ink droplets for expansion within a texture layer, compared to an unlimited expansion the expanded ink droplet can deviate from a spherical shape. The ink droplets in a texture layer can therefore additionally expand upwards after the expansion by the volume fraction that is not available within the plane owing to the limited space.

The closer the ink droplets come to each other within the texture layer, i.e. the smaller the region for an expansion of the ink droplets within the texture layer is, the greater can be the increase in height of the texture layer when the ink droplets are activated. In this case the ink droplets can mutually impede each other during the expansion within the plane of the texture layer and thus cause a forced upward expansion of the ink droplets.

If a distance between the ink droplets is chosen which is greater than the diameter of an expanded diameter, the ink droplets can be freed from mutual influence within the texture layer during the expansion. In such a case the height of the texture layer after activation of the ink droplets corresponds to the diameter of the approximately spherical, activated ink droplets.

A preferred embodiment of the invention consists in the fact that the distance between the individual applied non-activated ink droplets for the texture layer is greater than a diameter of the non-activated ink droplets. In particular, an overlapping of the individual applied, non-activated ink droplets can contribute to a disadvantageous mixing of the individual ink droplets before activation. By means of the separate, discrete application of the individual ink droplets these can be provided on the application surface, in particular the textile, in a particularly fixed manner. Furthermore, a height of the texture layer can be adjusted particularly accurately in this way.

It is particularly expedient according to a development of the invention that the distance between the individual applied ink droplets for the texture layer is variably adjusted, whereby the height is varied within the texture layer. The distance between individual ink droplets within a texture layer to be formed can be adjusted individually. As a result, the expansion height of an ink droplet on activation, i.e. when the predefined volume increase occurs, can be adjusted individually within a texture layer, enabling the texture layer to be configured with a height profile.

In particular for the provision of the ink droplets in a fixed location, it is provided according to a preferred development of the invention that a print pattern for the texture is digitally stored in a programmable control unit and at least one digital print head is used for applying the ink droplets, which is connected to the programmable control unit. By means of the programmable control unit, the three-dimensional texture to be formed, i.e. the print pattern after activation of the ink droplets, can be broken down digitally into individual texture layers to be printed. For a calculation of the printing point distribution in the individual texture layers, in particular information regarding the defined volume increase of the at least one variable-volume ink used can be stored in the programmable control unit. The volume increase can in particular be a final volume of an ink droplet after activation and expansion minus the volume of the applied ink. In approximate terms, the volume increase can be described as from virtually a zero volume of the non-activated ink droplet to the activated final volume. This can be omitted particularly for highly expanding inks. By means of a digital print head, an accurately defined quantity of variable-volume ink can be provided repeatedly in a particularly precise manner when printing the ink droplets. Thus, for a texture layer in particular, a reproducible print pattern can be defined by the programmable control unit, wherein the at least one digital print head can be delivered to the individual points of the pattern for printing.

Preferably, a quantity of variable-volume printing ink can also be individually adjusted for each of the ink droplets. For at least a first ink droplet, therefore, an increased quantity of printing ink can be provided, with ink droplets having a reduced quantity of ink possibly being provided in turn in another region of the texture layer. The ink droplet volume can also alternate in any manner within a texture layer.

For the successive build-up of a defined three-dimensional texture it can be expedient that, to form at least a second texture layer, the variable-volume ink droplets are each applied to an underlying texture layer and activated. In principle, the defined three-dimensional texture according to the present invention can be formed by an individual texture layer. If the provision of at least a second texture layer is necessary for the height of the overall texture, the second texture layer can be applied to an already provided first texture layer, i.e. a first layer or subjacent plane of activated ink droplets. The overall height of the texture can correspond to the sum of the heights of the individual texture layers. The ink droplets of at least a second texture layer are preferably therefore applied not directly to the textile but at least in part to an underlying texture layer.

It is particularly expedient according to a development of the present invention for the distance between ink droplets within a texture layer to be varied between superimposed regions of different texture layers. In particular by varying a position of ink droplets within a texture layer relative to the position of the ink droplets in an underlying texture layer, a particular elasticity of the three-dimensional texture can be achieved. The position of the individual ink droplets can be influenced e.g. by reducing the distance between the ink droplets at least in a region of a texture layer. This reduction of the distance between ink droplets can result in an increase in the height of the texture layer. To compensate for this local elevation in an underlying texture layer, the distance between ink droplets can be increased in the corresponding region in an overlying texture layer, whereby the additional height of the first texture layer is compensated. Thus, a texture that is even overall, with a preferably smooth surface, can be formed.

It is particularly preferred according to a development of the method according to the invention that, to establish a depression in a texture layer, ink droplets of the texture layer in the region of the depression are arranged at a distance from each other that is greater than the distance between ink droplets of the texture layer outside the depression. In principle, by varying the distance between ink droplets within a texture layer the texture layer can be formed with different heights in some regions after activation. As a result, a secondary texture, in particular with a tactile character, can be formed on the defined three-dimensional texture. In particular by alternately reducing and increasing the distance along the surface of a texture layer, the texture layer can be formed with a roughness. This can also affect e.g. the tactile character and/or roughness of the three-dimensional texture overall.

According to a development of the present invention it is preferred for at least a second variable-volume ink to be provided for the texture, which when activated exhibits a predefined volume increase that differs from the first variable-volume ink. In addition or alternatively to a variation of a distance between individual ink droplets in a texture layer and/or a variation of a quantity of ink for the individual ink droplets, a varying height within a texture layer can also be achieved by forming at least some of the ink droplets of the texture layer with a second variable-volume ink. This can enable the texture layer formed after activation to be provided with a roughness, unevenness or varying height even with an equidistant provision of ink droplets.

It is particularly preferred according to a development of the invention that the at least two variable-volume inks are provided in order to provide ink droplets for the same and/or for different texture layers of the texture. By the provision of the at least two variable-volume inks within the same texture layer, in particular a surface finish of the texture layer can be adjusted. In this case the at least two variable-volume inks can be provided for ink droplets with the same or varying distance/volume. In particular when the variable-volume inks are provided in different texture layers, texture layers can be formed which have different properties, in particular a specific flexibility or stiffness. As a result, for example an elasticity of the defined three-dimensional texture, which is made up of the individual texture layers, can be adjusted. Thus, for example, a variable-volume ink that exhibits a particularly large volume increase when activated can bring about a specific ductility of the texture layer that is formed. A variable-volume ink that exhibits only a small volume increase when activated can in particular contribute to a rigidity of the three-dimensional texture, and in particular the texture layer.

Particularly preferably, the ink droplets in a texture layer are provided at a mutual distance A that corresponds to $A < D * \sqrt{2}$ (D=diameter) of the expanded ink droplets.

The three-dimensional texture for a textile according to the invention is characterized in that the ink droplets for the at least one texture layer are provided with at least a distance from each other that is smaller than or equal to the diameter of activated droplets.

A further basic concept of the present invention consists in providing a three-dimensional texture having at least one texture layer. The at least one texture layer can be formed from activated ink droplets, which are at a distance from each other. This distance can in particular be configured such that the individual ink droplets do not overlap before activation, and particularly preferably do not touch. The ink droplets in a texture layer can impede or influence each other in the volume increase, i.e. the expansion, based on the choice of the distance from each other. As a result of the distance between the ink droplets chosen according to the invention, these are not necessarily present after activation in the form of ideal spheres but rather in the form of deformed ink droplets, in particular laterally squashed by further activated ink droplets of the texture layer, and/or egg-shaped ink droplets, which are formed with a height that can exceed the height of an ideal sphere. By means of the defined distance between the individual ink droplets, a resulting height of the texture layer can thus be adjusted by the individually adjustable limitation of the region available for expansion in the plane. The height of the texture layer here can be greater with a decreasing distance between the individual ink droplets than in a texture layer in which the ink droplets are provided at a greater distance from each other.

According to a development of the present invention it is provided that the distance between the ink droplets for the at least one texture layer is greater than a diameter of non-activated ink droplets.

It is particularly preferred according to a development of the invention for the texture to have at least a second variable-volume ink, which exhibits a predefined volume increase when activated and which differs from the first variable-volume ink. The individual ink droplets of the at least one texture-forming texture layer can therefore be formed from different inks. These inks can in particular exhibit different, but in each case defined, volume increases when activated. By the provision of different inks within a texture layer in regions or in points, the texture layer formed after activation can be provided with a surface finish, in particular a roughness or unevenness and/or tactile characteristic.

It is particularly expedient according to a development of the invention for the at least two variable-volume inks to be provided in the same and/or in different texture layers of the texture. By providing the at least two variable-volume inks within the same texture layer, this can be formed e.g. with an unevenness, as already described above. In particular by the provision of different inks in different texture layers of the three-dimensional texture to be formed, this can be formed with different properties. Thus by means of a first variable-volume ink, for example, at least one texture layer can be provided with a specific elasticity for the three-dimensional texture, whereas by means of a second variable-volume ink at least one texture layer is formed that provides a particularly high stiffness for the three-dimensional texture. The inks can also be configured with different pigments or can be transparent. Within a texture according to the invention, in particular within a texture layer, each variable-volume ink that is provided can be provided with a plurality of colors, in particular pigments.

The properties of the individual variable-volume inks can depend in particular on the volume increase of the respective ink. Thus for example an ink with a particularly large volume increase can promote a particularly ductile or soft tactile character, whereas an ink with a smaller volume increase after activation provides a texture layer having particularly high rigidity and/or roughness.

Ink droplets for a texture layer can be non-activated droplets, whereas ink droplets of a texture layer can be activated, i.e. layer-forming, droplets.

In a marginal region of the texture, in which ink droplets are not necessarily surrounded on all sides by ink droplets, a divergent height of the ink droplets can occur when activated. This circumstance can be counteracted by adapting the distance between the ink droplets within the marginal area.

Figure 2:
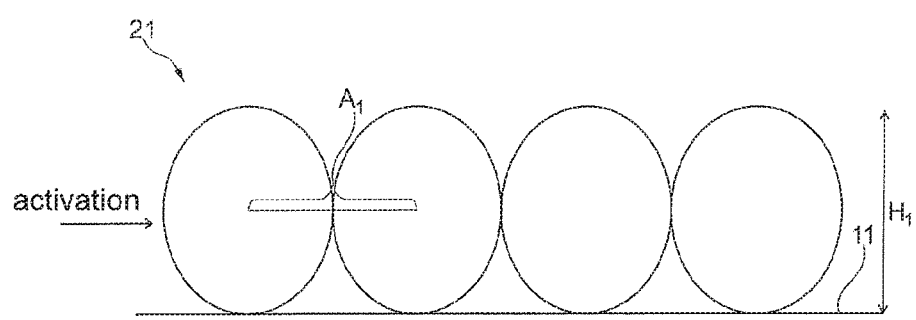
Figure 3:
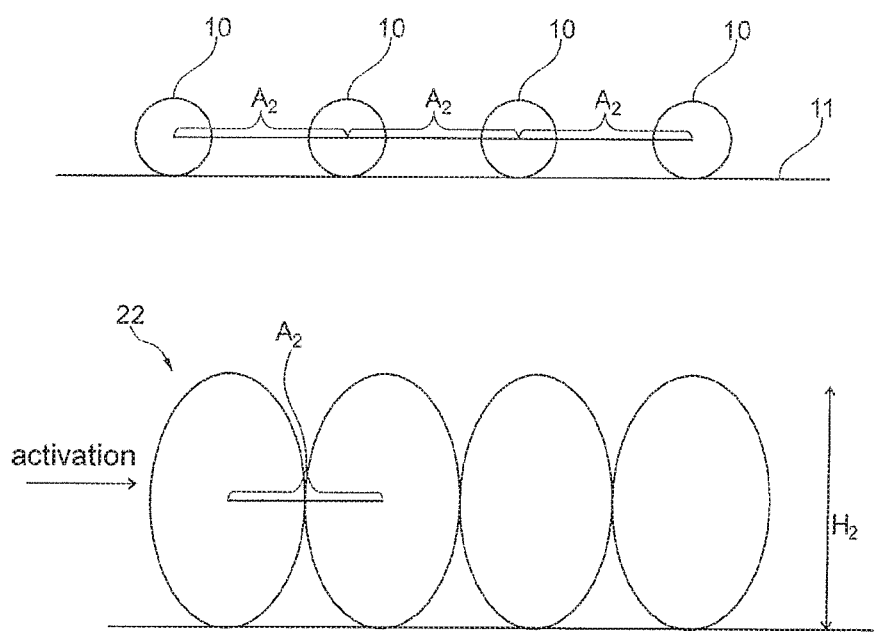
Figure 4:
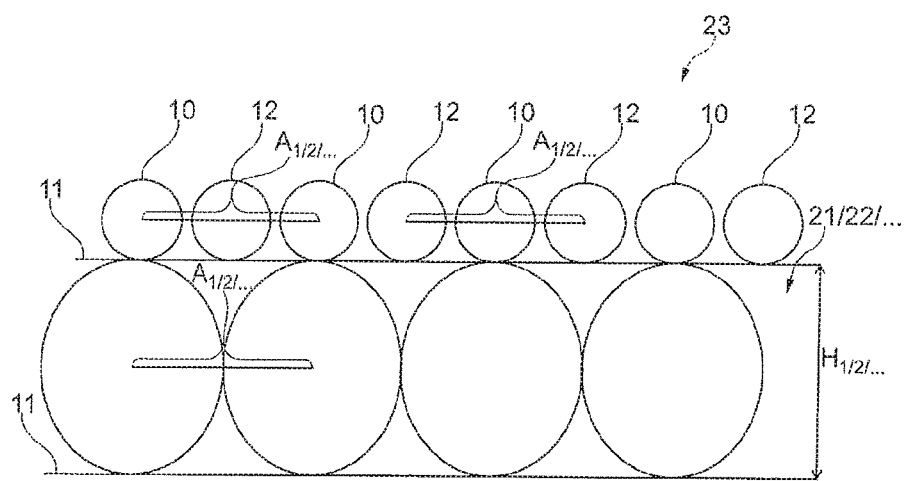

In the drawings, the invention is further explained below. The figures show the following:

FIG. 1: a side view of an applied ink droplet and an expanded ink droplet,

FIG. 2: a side view of an arrangement of ink droplets and activated ink droplets, which form a texture layer with a height $H_1$, FIG. 3: a side view of an arrangement of ink droplets and an arrangement of activated ink droplets, which form a texture layer with a height $H_2$, and FIG. 4: an arrangement of ink droplets on an underlying texture layer, formed from activated ink droplets.

FIG. 1 shows an ink droplet 10 with a diameter $D_1$. Such ink droplets can be provided on a textile so as jointly to form at least one texture layer of a three-dimensional texture after activation. The texture layer here is formed from a plurality of activated ink droplets 20 with a diameter $D_2$, wherein $D_2 > D_1$. The three-dimensional texture according to the invention can preferably be formed from one layer. Particularly preferably, multiple texture layers are arranged one on top of another and jointly form the three-dimensional texture according to the invention. As a result of activation the volume of the ink droplet 10 increases. As a result of the volume increase the diameter $D_1$ of the ink droplet changes to the diameter $D_2$, wherein $D_2$ can be greater than or equal to $D_1$.

FIG. 2 shows an arrangement of ink droplets 10 arranged adjacent to each other. The plane 11 indicated below the ink droplets 10 can be e.g. a textile or a subjacent texture layer on which the ink droplets 10 are provided. The ink droplets 10 can be provided on the surface 11 at a distance $A_1$ from each other. This distance can be greater than and/or equal to the diameter of the non-activated ink droplet, i.e. greater than or equal to $D_1$ but also $\geq D_2$. The illustration according to FIG. 2 is a schematic side view. Both behind and in front of the plane of the image, further ink droplets 10 for the texture layer can be arranged, whereby each ink droplet within the plane of application is surrounded by a plurality of ink droplets, preferably at least four, particularly preferably eight ink droplets. After application of the ink droplets 10 these can be activated to form the texture layer 21. The activation can take place e.g. chemically or thermally. Since the distance between the activated ink droplets of the texture plane 21 according to FIG. 2 can be smaller than the diameter $D_2$ of an expanded activated ink droplet, whereby the space available within the plane is smaller than would be needed for an ideal spherical expansion of the ink droplet, the texture plane 21 can be formed with a height that is greater than the diameter $D_2$ of the expanded ink droplet 20 according to FIG. 1. By activation and expansion of the ink droplets 10, the texture layer 21 can be formed.

The volume increase of the ink droplet can preferably be provided in the form of a predefined volume increase. This can result in the fact that the ink droplet, which is preferably provided with the same volume, always undergoes the same volume increase.

Particularly preferably, the volume increase can additionally be influenced by the duration of the activation, in particular the duration of a chemical or thermal treatment.

FIG. 3 shows an arrangement of ink droplets 10 on a plane 11, wherein the ink droplets are arranged at a distance $A_2$ from each other. As also stated with reference to FIG. 2, the illustration according to FIG. 3 is a side view in which a section through the plane of application 11, in particular through a textile, with the applied droplets 10 is present. In the arrangement according to the invention as in FIG. 3 the individual ink droplets are in principle surrounded by a plurality of ink droplets 10 within the plane 11. Preferably the individual ink droplets are surrounded by at least four, particularly preferably eight, further ink droplets within the plane. The individual ink droplets within the texture layer 22 to be formed are provided at a distance $A_2$ from each other, wherein the distance $A_2$ is smaller than the distance $A_1$ according to FIG. 2.

After activation, a texture layer 22 is formed from the droplets 10, which have a height $H_2$. Owing to the reduced distance $A_2$ compared to $A_1$, the height of the texture layer $H_2$ is greater than $H_1$. Consequently, the height of the texture layer to be formed can be influenced by the adjustment of a spacing between the individual applied ink droplets. The smaller the distance between the ink droplets, the higher will be the texture layer formed after activation of the individual applied ink droplets.

FIG. 4 shows a first texture layer 21, which can be formed from the ink droplets 10 according to FIG. 2 with the distance $A_1$. Accordingly, this has the height $H_1$. The texture layer 21 that is formed forms the plane 11 according to FIGS. 2 and 3, on which a second texture layer can be provided. For this purpose, ink droplets 10 can be provided on a surface/plane of the texture layer 21 e.g. at a distance $A_2$ from each other. The ink droplets 10 on the first texture layer 21 can be provided at an arbitrary distance from each other. The first texture layer 21 can also be formed from ink droplets that are at an arbitrary and/or varying distance from each other. As can be seen from FIG. 4, the distance between the ink droplets in the first texture layer 21 can differ from that between the ink droplets 10 applied on the texture layer 21 for a second texture layer 23. The ink droplets for the second texture layer 23 can be provided above the position of the ink droplets for the texture layer 21. As a result, the ink droplets of the individual planes are arranged approximately coaxially to each other. Alternatively, the ink droplets 10 for a second texture plane 23 can also be provided such that they are offset from the position of the ink droplets 10 for a first texture plane 21. These are shown in FIG. 4 in the form of grey circles 12. After activation of the ink droplets 10 and/or 12 on the first texture layer 21, a second texture layer 23 is formed on the texture layer 21.

When all the provided layers have been activated, the texture can be formed.

The distance between ink droplets can also vary within the individual texture layers. As a result, texture layers of different heights or individual texture layers with a height profile can be formed. By means of appropriate, e.g. alternating, arrangement of ink droplets with increased and reduced distances from each other, an unevenness or roughness of the respective texture layer can be formed.

The invention claimed is:

1. A method of producing a defined three-dimensional texture on a textile, the method comprising:
   providing a texture on the textile, the texture having a defined area and a defined height,
   forming the texture with at least one texture layer, wherein the height and the area of the texture are adjusted by at least one defined height and at least one defined area of the at least one texture layer,
   applying at least one variable-volume ink to the textile in the form of individual non-activated ink droplets, wherein a plurality of the ink droplets are provided on the textile according to the area of the texture, and activating the applied ink droplets, whereby a predefined volume increase of the ink droplets is produced and the at least one texture layer is formed on the textile,
   wherein
   the distance between the individual non-activated ink droplets after being applied in the applying step is smaller than and/or equal to a diameter of activated ink droplets of the texture layer.

2. The method according to claim 1,
   wherein
   the distance between the individual non-activated ink droplets for the texture layer applied in the applying step is greater than a diameter of the non-activated ink droplets.

3. The method according to claim 1,
   wherein
   the distance between the individual applied ink droplets for the texture layer is variably adjusted, whereby the height within the texture layer is varied.

4. The method according to claim 1,
   wherein
   a print pattern for the texture is stored digitally in a programmable control unit and at least one digital print head is used for applying the ink droplets, which is connected to the programmable control unit.

5. The method according to claim 1, comprising
   forming at least a second texture layer by applying the at least one variable-volume ink in the form of the individual non-activated ink droplets to an underlying texture layer and activating the applied ink droplets.

6. The method according to claim 1,
   wherein
   the distance between ink droplets within a texture layer is varied between superimposed regions of different texture layers.

7. The method according to claim 1, comprising
   establishing a depression in a texture layer by arranging ink droplets of the texture layer in a region of the texture layer including the depression at a distance from each other that is greater than the distance between ink droplets of the texture layer in a region of the texture layer not including the depression.

8. The method according to claim 1,
   wherein
   at least a second variable-volume ink for the texture is provided, which exhibits a predefined volume increase when activated and which differs from the first variable-volume ink.

9. The method according to claim 8,
   wherein
   the at least two variable-volume inks are provided in order to provide ink droplets in the same and/or in different texture layers of the texture.

10. A three-dimensional texture on a textile, the texture having
    an area and a height,
    at least one texture layer, which is formed from at least one variable-volume ink in the form of individual activated ink droplets, which are applied to the textile as non-activated ink droplets and are activated for a defined volume increase,
    wherein
    the non-activated ink droplets for the at least one texture layer are located at a distance from each other that is smaller than or equal to the diameter of the activated ink droplets.

11. The three-dimensional texture according to claim 10, wherein
the distance between the activated ink droplets for the at least one texture layer is greater than a diameter of the non-activated ink droplets.

12. The three-dimensional texture according to claim 10, wherein
the texture has at least a second variable-volume ink, which exhibits a predefined volume increase when activated and which differs from the first volume-variable ink.

13. The three-dimensional texture according to claim 12, wherein
the at least two variable-volume inks are provided in the same and/or in different texture layers of the texture.

\* \* \* \* \*